No. 713,336. Patented Nov. 11, 1902.
H. G. OSTERBERG.
PIANO TUNING PIN.
(Application filed May 26, 1902.)
(No Model.)
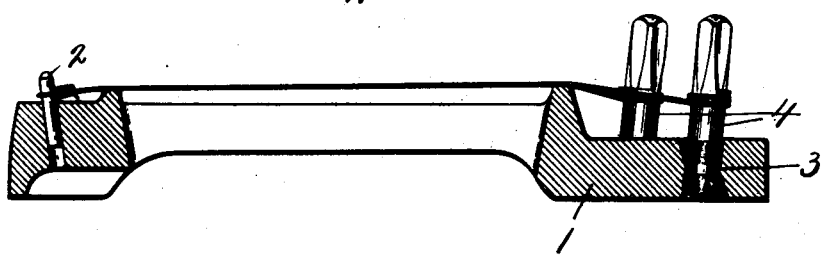
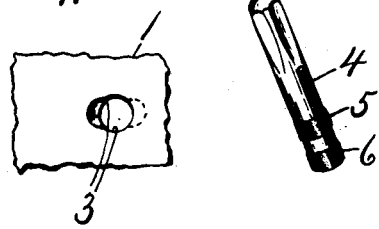
WITNESSES:
INVENTOR
Hans G. Osterberg.
BY
Smith & Brison
ATTORNEYS.

UNITED STATES PATENT OFFICE.

HANS G. OSTERBERG, OF AUBURN, NEW YORK, ASSIGNOR TO THE WEGMAN PIANO COMPANY, OF AUBURN, NEW YORK, A CORPORATION OF NEW YORK.

PIANO TUNING-PIN.

SPECIFICATION forming part of Letters Patent No. 713,336, dated November 11, 1902.

Application filed May 26, 1902. Serial No. 109,034. (No model.)

*To all whom it may concern:*

Be it known that I, HANS G. OSTERBERG, of Auburn, in the county of Cayuga, in the State of New York, have invented new and useful Improvements in Piano Tuning-Pins, of which the following, taken in connection with the accompanying drawings, is a full, clear, and exact description.

This invention relates to improvements in tuning-pins and bearings therefor.

The object of this invention is to prevent the tuning-pin from accidental rotation in its bearing due to the tension of the string.

To this end the invention consists in the formation of a tuning-pin and its bearing, as hereinafter fully described, and pointed out in the claim.

Referring to the drawings, Figure 1 is a sectional view of a portion of a string-frame of a pianoforte, showing my improved tuning-pin and bearing mounted thereon. Fig. 2 is a perspective view of one of the detached tuning-pins. Fig. 3 is a plan of a fragmentary part of the frame, showing one of the bearings for the tuning-pin.

In the drawings I have shown a frame 1, having hitch-pins 2 and bearings 3, in which are mounted tuning-pins 4. The frame 1 may be of any desired construction and adapted to receive the strings of any form of stringed instrument and is provided with a number of sockets or openings for forming the bearings 3. These bearings receive the tuning-pins 4 and their opposite ends are elongated in the direction of the "pull" of the strings, said elongated ends being tapering or wedge shape, the smaller side of the opening nearest the point of securement of the string on the tuning-pin being toward the hitch-pin and the smaller side of the opposite end of the opening extending in the opposite direction, so that when the hitch-pin is secured in position in the opening or bearing 3 and the string is tensioned said pin wedges into the smaller sides of the opposite ends of the bearing 3 and facilitates the holding of the pin from accidental rotary movement. It is found, however, that the mere tapering of the opposite ends of the opening or bearing 3 is insufficient to hold the pin from rotating under the high tension of the string, and I have made the securement of the pin almost if not absolutely certain by providing said pin with irregularly-roughened surfaces 5 and 6, which engage the smaller sides of the opposite ends of the bearing 3 and more firmly hold said tuning-pin in position when the strings are tensioned.

The operation of my invention will now be readily understood upon reference to the foregoing description and the accompanying drawings, and it will be noted that the primary function of the roughened surface or surfaces of the tuning-pin is to produce greater friction between the pin and its bearing for the purpose of more firmly holding the pin from accidental rotation and incidentally to maintain the tone of the string and to make it more permanent after once tuned, and although these roughened surfaces coöperate with the wedge-shaped extremities of the bearings it will be evident that my invention is equally applicable in straight bearings or bearings of uniform diameter throughout their entire lengths. Therefore while the wedging effect is important it is not altogether essential.

Having thus described my invention, what I claim, and desire to secure by Letters Patent, is—

In combination with a string-frame of a musical instrument having an opening, the opposite ends of the opening tapering in opposite directions in line with the pull of the string, and a tuning-pin inserted in the opening and provided with roughened surfaces engaging said tapering ends of the opening.

In witness whereof I have hereunto set my hand this 10th day of May, 1902.

HANS G. OSTERBERG.

Witnesses:
H. E. CHASE,
MILDRED M. NOTT.